United States Patent
Koerber et al.

(10) Patent No.: US 11,512,769 B2
(45) Date of Patent: Nov. 29, 2022

(54) MOTOR VEHICLE DEVICE LUBRICATED WITH A WATER-CONTAINING LUBRICANT

(71) Applicant: Bayerische Motoren Werke Aktiengesellschaft, Munich (DE)

(72) Inventors: Martin Koerber, Neufahrn (DE); Georg Johann Meingassner, Taufkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 178 days.

(21) Appl. No.: 16/977,206

(22) PCT Filed: Apr. 18, 2019

(86) PCT No.: PCT/EP2019/060076
§ 371 (c)(1),
(2) Date: Sep. 1, 2020

(87) PCT Pub. No.: WO2019/219330
PCT Pub. Date: Nov. 21, 2019

(65) Prior Publication Data
US 2021/0010582 A1 Jan. 14, 2021

(30) Foreign Application Priority Data
May 15, 2018 (DE) ..................... 10 2018 207 442.9

(51) Int. Cl.
*F16H 57/02* (2012.01)
*F16H 57/027* (2012.01)
(52) U.S. Cl.
CPC .................................. *F16H 57/027* (2013.01)
(58) Field of Classification Search
CPC ................... F16H 57/02; F16H 57/027; F16H 2057/02043
See application file for complete search history.

(56) References Cited

U.S. PATENT DOCUMENTS 5,522,769 A * 6/1996 DeGuiseppi ............ F21S 45/33
454/270
9,845,862 B2 * 12/2017 Basham ................. B01D 53/14
(Continued)

FOREIGN PATENT DOCUMENTS

DE 39 23 530 A1 1/1990
DE 19523454 A1 * 1/1997 ........... F16H 57/027
(Continued)

OTHER PUBLICATIONS

International Search Report (PCT/ISA/210) issued in PCT Application No. PCT/EP2019/060076 dated Jul. 15, 2019 with English translation (five (5) pages).
(Continued)

*Primary Examiner* — Adam D Rogers
(74) *Attorney, Agent, or Firm* — Crowell & Moring LLP

(57) ABSTRACT

A motor vehicle device has a device interior in which a water-containing lubricant is held in order to lubricate at least one component arranged in the device interior. The device interior is fluidically connected to a venting apparatus for pressure equalization with the environment surrounding the motor vehicle device. The venting apparatus has a semipermeable membrane, which is water-impermeable in a first direction, i.e. from a first surface of the membrane to a second surface. The first surface of the semipermeable membrane faces the device interior and therefore the semipermeable membrane seals off the device interior from the environment surrounding the motor vehicle device in such a way that water and water vapor cannot permeate.

4 Claims, 1 Drawing Sheet

(56) References Cited

U.S. PATENT DOCUMENTS

| | | | |
|---|---|---|---|
| 10,175,001 B2 * | 1/2019 | Mayr | ............... F28B 9/08 |
| 2009/0277298 A1 | 11/2009 | Mayr | |
| 2011/0056574 A1 | 3/2011 | Welch et al. | |
| 2012/0149616 A1 | 6/2012 | Schmid-Amelunxen et al. | |
| 2022/0042449 A1 * | 2/2022 | Gutzer | ............. F01M 9/02 |

FOREIGN PATENT DOCUMENTS

| | | | | |
|---|---|---|---|---|
| DE | 199 04 033 A1 | 6/2000 | | |
| DE | 101 22 993 A1 | 12/2002 | | |
| DE | 10 2008 005 395 A1 | 7/2009 | | |
| DE | 10 2008 050 149 B3 | 2/2010 | | |
| DE | 10 2009 039 626 A1 | 3/2011 | | |
| DE | 10 2010 035 808 A1 | 4/2011 | | |
| DE | 10 2010 025 980 A1 | 1/2012 | | |
| DE | 10 2015 217 112 A1 | 3/2017 | | |
| DE | 20 2016 004 440 U1 | 11/2017 | | |
| DE | 102017122639 A1 * | 3/2019 | | |
| EP | 1239189 A2 * | 9/2002 | ............ | F16H 57/027 |
| EP | 1921732 A1 * | 5/2008 | ........ | B29C 45/14778 |
| JP | 2007127139 A * | 5/2007 | ............ | F16H 57/027 |
| KR | 20110100798 A * | 9/2011 | | |
| WO | WO 2007/098523 A2 | 9/2007 | | |
| WO | WO-2020120094 A1 * | 6/2020 | ......... | F01M 13/0011 |

OTHER PUBLICATIONS

German-language Written Opinion (PCT/ISA/237) issued in PCT Application No. PCT/EP2019/060076 dated Jul. 15, 2019 (six (6) pages).

German-language Office Action issued in German Application No. 10 2018 207 442.9 dated Mar. 26, 2019 (seven (7) pages).

* cited by examiner

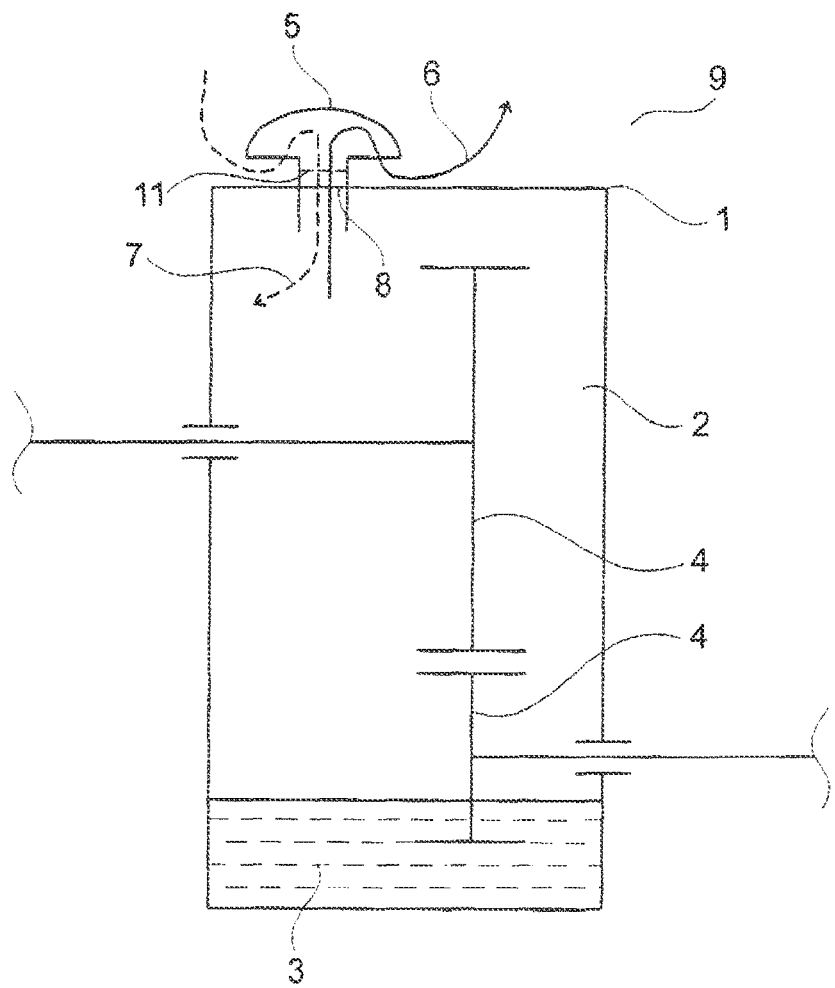

MOTOR VEHICLE DEVICE LUBRICATED WITH A WATER-CONTAINING LUBRICANT

BACKGROUND AND SUMMARY OF THE INVENTION

The invention relates to a liquid-lubricated motor vehicle device having a ventilation installation.

A motor vehicle device having a device interior space in which a water-containing lubricant is received for lubricating at least one component disposed in this device interior space is known from DE 10 2010 025980 A1.

The invention is described hereunder in the context of a water-containing lubricant; this description is not to be understood as a limitation of the invention. Water-containing lubricants in comparison to conventional lubricants offer advantages in particular with a view to efficiency and in particular also in terms of thermal behavior. The lubricating properties of such a water-containing lubricant depend inter alia on the water content in this lubricant. In the operation of a motor vehicle device, temperatures in the lubricant can be reached such that water is converted to water vapor and escapes from the motor vehicle device.

It is the object of the invention to provide a motor vehicle device having a water-containing lubricant, wherein the variability of the water content in this water-containing lubricant is improved in comparison to a conventional motor vehicle device, that is to say that the variability of the water content is kept almost constant during the operation of the motor vehicle device. This object is achieved by a motor vehicle device as claimed in the independent claim; preferred embodiments of the invention are the subject matter of the dependent claims.

In the context of the invention, a motor vehicle device is to be understood to be a device in a motor vehicle, and preferably a transmission installation, and particularly preferably a transmission installation in the drivetrain for transmitting the drive forces for overcoming rolling resistances. This motor vehicle device has a device interior space in which at least one and preferably a multiplicity of components, which in the operation of the motor vehicle device is/are at least temporarily lubricated by a lubricant, is/are disposed.

Such a component is preferably understood to be a gear wheel, a bearing, a shifting element, or a shaft, in particular a transmission shaft. This lubricant is furthermore received in this device interior space or for lubricating the at least one component is incorporated into this device interior space. This lubricant is furthermore configured as a water-containing lubricant. A water-containing lubricant in the context of the invention is to be understood to be a lubricant which comprises at least 5% or more by volume of water, the remaining components of this lubricant potentially being solids, preferably so-called nanoparticles, or water-soluble substances. Water-containing lubricants per se are known from the prior art and are in some instances also referred to as water-based lubricants. The operating properties of the motor vehicle device can in particular be improved by using water-containing lubricants.

The motor vehicle device preferably has a ventilation installation for pressure equalization with the environment surrounding the motor vehicle device during the operation of the motor vehicle device; in other words, the device interior space, by means of the ventilation installation, is in particular fluidically connected to this environment. This ventilation installation furthermore has a semi-permeable membrane.

A semi-permeable membrane in the context of the invention is to be understood to be a membrane which is impermeable to water and/or water vapor in a first direction, from a first surface toward a second surface, and this membrane is furthermore preferably permeable to water and/or water vapor in a second direction, from the second surface toward the first surface. Membranes of this type in a similar form are also known under various trade names from their use in breathable sportswear.

The semi-permeable membrane by way of the first surface thereof faces the device interior space such that an imaginary fluid flow from the device interior space into the environment surrounding the motor vehicle device would have to flow through this membrane from the first surface to the second surface of the membrane; however, this direction of flow is specifically blocked by the installed position of the semi-permeable membrane and an escape, in particular of water vapor, from the device interior space into the environment is thus able to be prevented.

The device interior space, in particular by a membrane disposed in such a manner, is closed off so as to be impermeable to water and water vapor in relation to the environment surrounding the motor vehicle device such that no moisture, or only minor quantities of moisture, can escape from the device interior space. By way of such a semi-permeable membrane it is thus furthermore possible for the exit of water or water vapor to at least be minimized, and the water content in the water-containing lubricant can thus be kept constant or almost constant.

In one preferred embodiment of the invention, a further membrane is provided in the ventilation installation. This further membrane in terms of a flow direction from the device interior space into the environment surrounding the motor vehicle device is preferably disposed downstream of the semi-permeable membrane. This further membrane is preferably configured as a semi-permeable membrane and is thus to be understood as a further semi-permeable membrane. This further semi-permeable membrane is furthermore preferably disposed in such a manner that this further semi-permeable membrane closes off this device interior space so as to be impermeable to water and water vapor in an imaginary flow direction from the environment surrounding the motor vehicle device into the device interior space. Figuratively speaking, the further semi-permeable membrane in such a case is disposed counter to the semi-permeable membrane. On account of a disposal of this type, it is in particular possible for the uncontrolled ingress of water and/or water vapor into the device interior space to be prevented or at least to be minimized.

In one preferred embodiment, the motor vehicle device is designed as a motor vehicle transmission, in particular as a motor vehicle transmission in the drivetrain of a motor vehicle that is designed for providing drive forces for overcoming rolling resistances (air drag, frictional resistance, incline resistance, etc.). The at least one component disposed in the device interior space is in particular configured as a gear wheel, or as a multiplicity of gear wheels, respectively.

Individual features of the invention are explained in more detail hereunder by means of a FIGURE.

BRIEF DESCRIPTION OF THE DRAWING

FIG. 1 shows a motor vehicle transmission having a water-containing lubricant and a transmission vent.

DETAILED DESCRIPTION OF THE DRAWING

A schematic longitudinal section through a motor vehicle transmission 1 is illustrated in FIG. 1. This motor vehicle transmission 1 is to be understood to be a motor vehicle device. The gear wheels 4, as components to be lubricated, are disposed in the motor vehicle transmission 1. The water-containing lubricant 3 for lubricating these gear wheels 4 is received in the transmission interior space 2. For venting, the motor vehicle transmission 1 has a transmission vent 5 (ventilation installation) having a semi-permeable membrane 8.

This semi-permeable membrane 8 herein is disposed in such a manner that this semi-permeable membrane 8 in a flow direction 6 from the transmission interior space 2 into the environment 9 surrounding the motor vehicle transmission 1 is impermeable to water or water vapor, respectively. Furthermore, this semi-permeable membrane 8 in terms of a flow direction 7 from the environment 9 surrounding the motor vehicle transmission 1 into the transmission interior space is permeable to water or water vapor, respectively. In one preferred embodiment, a further membrane 11 is provided in the ventilation installation 5. This further membrane 11 in terms of the flow direction 6 from the device interior space 2 into the environment 9 surrounding the motor vehicle device 1 is preferably disposed downstream of the semi-permeable membrane 8. This further membrane 11 is preferably configured as a semi-permeable membrane and is thus to be understood as a further semi-permeable membrane. This further semi-permeable membrane 11 is furthermore preferably disposed in such a manner that this further semi-permeable membrane 11 closes off this device interior space 2 so as to be impermeable to water and water vapor in the flow direction 7 from the environment 9 surrounding the motor vehicle device 1 into the device interior space 2. Figuratively speaking, the further semi-permeable membrane 11 in such a case is disposed counter to the semi-permeable membrane 8. On account of a disposal of this type, it is in particular possible for the uncontrolled ingress of water and/or water vapor into the device interior space 2 to be prevented or at least to be minimized.

By way of such a design embodiment of the motor vehicle transmission 1 it is possible that no moisture or only minor quantities of moisture (water/water vapor) can escape from the motor vehicle transmission 1, and that the water content in the water-containing lubricant 3 in the transmission interior space 2 is thus kept at least substantially constant during operation.

What is claimed is:

1. A motor vehicle device, comprising:
   a device interior space in which, for lubricating at least one component disposed in said device interior space, a water-containing lubricant is received; and
   a ventilation installation fluidically coupled with the device interior space for pressure equalization with an environment surrounding the motor vehicle device, wherein
   the ventilation installation has a semi-permeable membrane which is impermeable to water in a first direction from a first surface of the semi-permeable membrane toward a second surface of the semi-permeable membrane, and is permeable to water in a second direction from the second surface of the semi-permeable membrane toward the first surface of the semi-permeable membrane, and
   the first surface of the semi-permeable membrane faces the device interior space such that the semi-permeable membrane closes off the device interior space so as to be impermeable to water and water vapor escaping from the device interior space to the environment surrounding the motor vehicle device.

2. The motor vehicle device according to claim 1, further comprising:
   a further membrane which, in terms of a flow direction from the device interior space into the environment surrounding the motor vehicle device, is disposed downstream of the semi-permeable membrane, wherein
   the further membrane is configured as a semi-permeable membrane and disposed such that the further membrane closes off the semi-permeable membrane so as to be impermeable to water and water vapor from the environment surrounding the motor vehicle device.

3. The motor vehicle device according to claim 2, wherein
   the motor vehicle device comprises a motor vehicle transmission, and
   the at least one component disposed in the device interior space is one or more gear wheels.

4. The motor vehicle device according to claim 1, wherein
   the motor vehicle device comprises a motor vehicle transmission, and
   the at least one component disposed in the device interior space is one or more gear wheels.

* * * * *